March 6, 1934.    C. BROWN    1,949,528
AUXILIARY DRAWBAR FOR MOTOR VEHICLES
Original Filed Feb. 27, 1930

INVENTOR
CARLETON BROWN
BY *Fetherstonhaugh & Co*
ATTORNEYS

Patented Mar. 6, 1934

1,949,528

UNITED STATES PATENT OFFICE 1,949,528

AUXILIARY DRAWBAR FOR MOTOR VEHICLES

Carleton Brown, Westmount, Quebec, Canada

Application February 27, 1930, Serial No. 431,905
Renewed January 13, 1934

2 Claims. (Cl. 280—33.44)

This invention relates to the provision of an auxiliary draw bar or transverse frame member adapted to be fastened to the frame of a powered vehicle to provide for the attachment of a trailer in such manner that the pulling strains imposed by the trailer are borne by the longitudinal frame members of the powered vehicle.

It is customary to couple a trailing vehicle to the conventional rear transverse frame member of a powered vehicle, as this is usually found to be the most convenient point of attachment. As a general rule, this transverse frame member is not originally designed to continuously withstand the strains incident to pulling another vehicle, in view of which the coupling of a trailer to this member is apt to be frowned upon by the manufacturers of automobiles and similar powered vehicles and, besides, is not an entirely safe practice.

The present invention has been designed to overcome these objections and it consists in the provision of an auxiliary transverse frame member having its terminals securely fastened to the longitudinal frame member of an automobile or similar powered vehicle. This auxiliary frame member is designed to provide a very strong and rigid draw bar to which a trailer may be coupled instead of being coupled, as heretofore, to the conventional rear transverse frame member with which practically all powered vehicle frames are equipped. As the auxiliary draw bar or frame member is fastened at its ends to the longitudinal frame members of the automobile or other vehicle, the pulling strains imposed by the trailer are transmitted to and borne by said longitudinal frame members.

Referring now to the accompanying drawing:—

Figure 1:
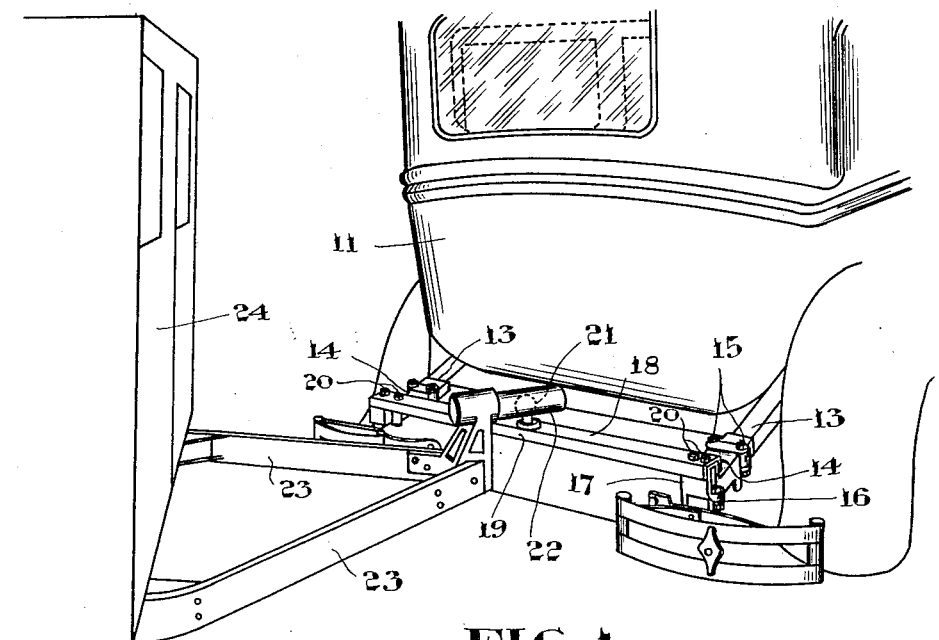
Figure 1 is a fragmentary perspective view showing a trailer coupled to the frame of an automobile through the agency of an auxiliary draw bar or transverse member constructed in accordance with the present invention.
Figure 2:
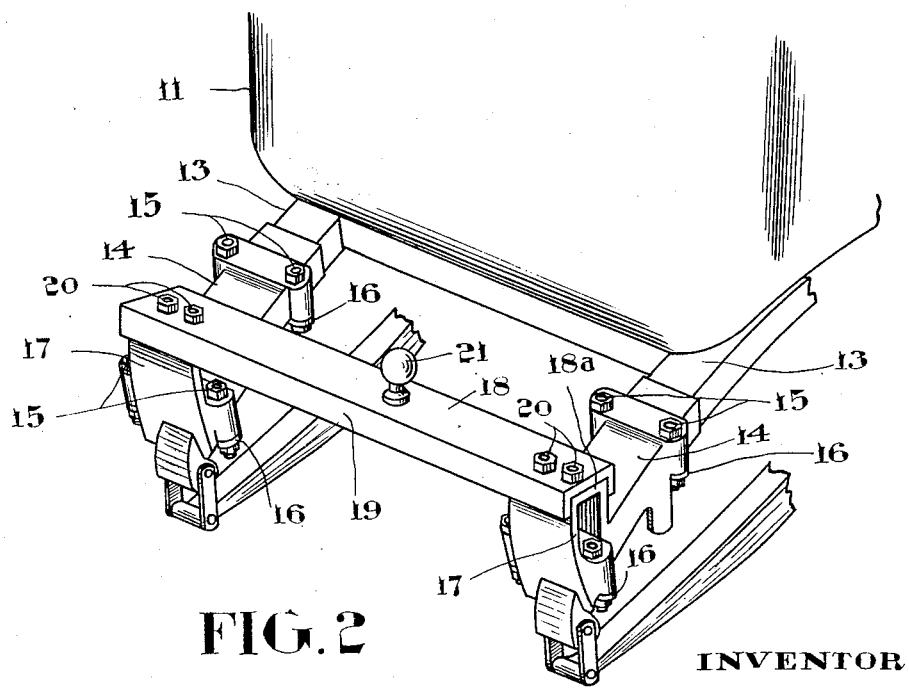
Figure 2 is a fragmentary perspective view of a portion of the automobile frame showing the manner of attaching the auxiliary draw bar or transverse frame member thereto.

Referring more particularly to the drawing, 11 designates the body of a conventional type of automobile equipped with a supporting frame or chassis including the usual longitudinal frame members 13. In accordance with the present invention, the rear end of each frame member 13 is equipped with a clamp 14 held thereto by a suitable arrangement of bolts 15 and clamping plates 16. The rear end of each clamp 14 is formed with an integral hollow casting 17 projecting upwardly therefrom. The top walls 18a of the castings 17 are formed to lie in a plane parallel to the ground surface and serve to support the ends of a transversely extending channel member 18 having its side flanges 19 directed downwardly and embracing opposite wall portions of the castings. The web of the channel member 18 is secured to the top walls 18a of the castings by suitable bolts indicated at 20.

The channel member 18 provides a relatively strong and rigid draw bar to which a trailer vehicle may be attached in any suitable manner. For example, the web of the channel member 18 may carry a ball 21 adapted to be received in any suitable form of socket 22 carried by the converging ends of a pair of V-shaped arms 23 fixed to any suitable form of trailer, such as that indicated at 24.

In coupling a two wheel trailer to a powered vehicle, it is essential that the frame of the trailer be supported in a plane substantially parallel to the ground surface and in order to provide for this, it is necessary that the hollow castings 17 be made of sufficient height and with the top walls 18a formed to lie in a plane parallel to the ground surface so as to provide for the necessary levelling of the channel member 18 and the trailer frame connected thereto. The height of the hollow castings 17 will, therefore, vary according to the character of the frame or chassis to which the clamps 14 and the channel member 18 are to be attached.

Having thus described my invention, what I claim is:—

1. The combination with the longitudinal frame members of an automobile or similar powered vehicle of means for attaching a trailer thereto comprising a pair of brackets resting upon the rear portions of said longitudinal frame members, said brackets having depending portions fitting upon opposite sides of the frame members to resist lateral displacement of the brackets, means rigidly securing the brackets in place on said frame members, a projection of inverted U-form extending upwardly from each bracket, a transversely extending bar having its ends resting on said projections and rigidly secured thereto, said bar being provided with depending side flanges engaging opposite sides of said projections to resist lateral displacement of the bar.

2. The combination with the longitudinal frame members of an automobile or other vehicle of means for attaching a trailer thereto comprising a pair of brackets resting on the rear portions of said longitudinal frame members, said brackets having depending portions engaging opposite faces of the frame members to resist lateral displacement of the brackets, means rigidly securing the brackets in place on said frame members, a transversely extending bar having its ends resting on said brackets and rigidly secured thereto, said bar being provided with depending front and rear flanges engaging corresponding faces of the brackets to resist lateral displacement of the bar.

CARLETON BROWN.